United States Patent
Tran

(10) Patent No.: US 9,130,900 B2
(45) Date of Patent: Sep. 8, 2015

(54) ASSISTIVE AGENT

(71) Applicant: Bao Tran, Saratoga, CA (US)

(72) Inventor: Bao Tran, Saratoga, CA (US)

( * ) Notice: Subject to any disclaimer, the term of this patent is extended or adjusted under 35 U.S.C. 154(b) by 287 days.

(21) Appl. No.: 13/841,294

(22) Filed: Mar. 15, 2013

(65) Prior Publication Data

US 2014/0280757 A1 Sep. 18, 2014

(51) Int. Cl.
G06F 15/16 (2006.01)
H04L 29/08 (2006.01)
G06Q 50/10 (2012.01)
G06Q 10/06 (2012.01)
G06Q 10/10 (2012.01)

(52) U.S. Cl.
CPC ............ H04L 67/02 (2013.01); G06Q 10/0631 (2013.01); G06Q 10/1093 (2013.01); G06Q 50/10 (2013.01)

(58) Field of Classification Search
USPC .......................................... 709/219, 202, 245
See application file for complete search history.

(56) References Cited

U.S. PATENT DOCUMENTS

| 8,346,563 | B1 * | 1/2013 | Hjelm et al. | 704/275 |
| 2005/0027871 | A1 * | 2/2005 | Bradley et al. | 709/227 |
| 2005/0091362 | A1 * | 4/2005 | Shigeta et al. | 709/223 |
| 2006/0106675 | A1 * | 5/2006 | Cohen et al. | 705/26 |
| 2006/0112180 | A1 * | 5/2006 | Vedula | 709/227 |
| 2011/0082735 | A1 * | 4/2011 | Kannan et al. | 705/14.23 |
| 2013/0268260 | A1 * | 10/2013 | Lundberg et al. | 704/8 |

* cited by examiner

Primary Examiner — Jude Jean Gilles
(74) Attorney, Agent, or Firm — Tran & Associates

(57) ABSTRACT

A system and method for providing automated assistance for a user using a computing device comprises, receiving a user request for assistance. The system and method can include determining semantics of the user request and identifying at least one domain, at least one task, and at least one parameter for the user request. The system and method can include accessing one or more semantic web services through an application and determine at least one responsive answer such as to respond to the user request.

20 Claims, 7 Drawing Sheets

ASSISTIVE AGENT

BACKGROUND

Personal productivity software has helped to streamline and simplify the role of information workers. Beginning with basic email clients, productivity software has grown to include a variety of other "desktop" applications, replacing paper calendars, rolodexes, and task lists with their software equivalents. Hybrid programs sometimes referred to as personal information managers (PIMs) have succeeded somewhat in combining these disparate programs into a single interface. Not only are such applications able to track appointments, to do's, contacts, and so forth, but they can combine the functions, such that setting up a meeting merely requires adding an appointment to your calendar and adding contacts to the appointment. Some applications have taken personal information managers a step further, enabling new interface methods, such as having a user's email read to her by phone.

Having all this relevant information available in one place may have enhanced user productivity, but these PIMs have failed to take full advantage of the information. For example, when a user creates a new appointment, she must still discern how long of a lead time will be needed for a reminder, or provide one default value that is used for all reminders. Furthermore, if the user is not at her desk when the reminder is triggered, then she may forget the appointment, and the reminder is wasted. Ultimately, PIMs and their users do not take full advantage of the information available to them to further enhance productivity.

United States Patent Application 20070043687 discloses methods for assisting a user with a variety of tasks. A virtual assistant has access to a user's contacts, calendar, and location. The virtual assistant also is able to access information about weather, traffic, and mass transit, and is able to adjust the time of for alerting a user about an upcoming appointment. The virtual assistant also has a rules engine enabling a user to create rules for handling incoming calls and instant messages, rerouting calls based on their caller identification. The virtual assistant also has a query engine enabling a user to find a document and to work with it, including sending it to a contact in the user's address book. Interfaces to virtual assistant may include installed software client, web browser, SMS/instant message, as well as an interactive voice response system.

One recent interaction paradigm is the Virtual Personal Assistant (VPA). Siri is a virtual personal assistant for the mobile Internet. Although just in its infancy, Siri can help with some common tasks that human assistants do, such as booking a restaurant, getting tickets to a show, and inviting a friend.

DETAILED DESCRIPTION

Various techniques will now be described in detail with reference to a few example embodiments thereof as illustrated in the accompanying drawings. In the following description, numerous specific details are set forth in order to provide a thorough understanding of one or more aspects or features described or reference herein. It will be apparent, however, to one skilled in the art, that one or more aspects or features described or reference herein may be practiced without some or all of these specific details. In other instances, well known process steps or structures have not been described in detail in order to not obscure some of the aspects or features described or reference herein. In this document, the term "or" is used to refer to a "nonexclusive or" unless otherwise indicated.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention nor a listing of features of one or more of the invention(s) that must be present in all embodiments.

Figure 1:
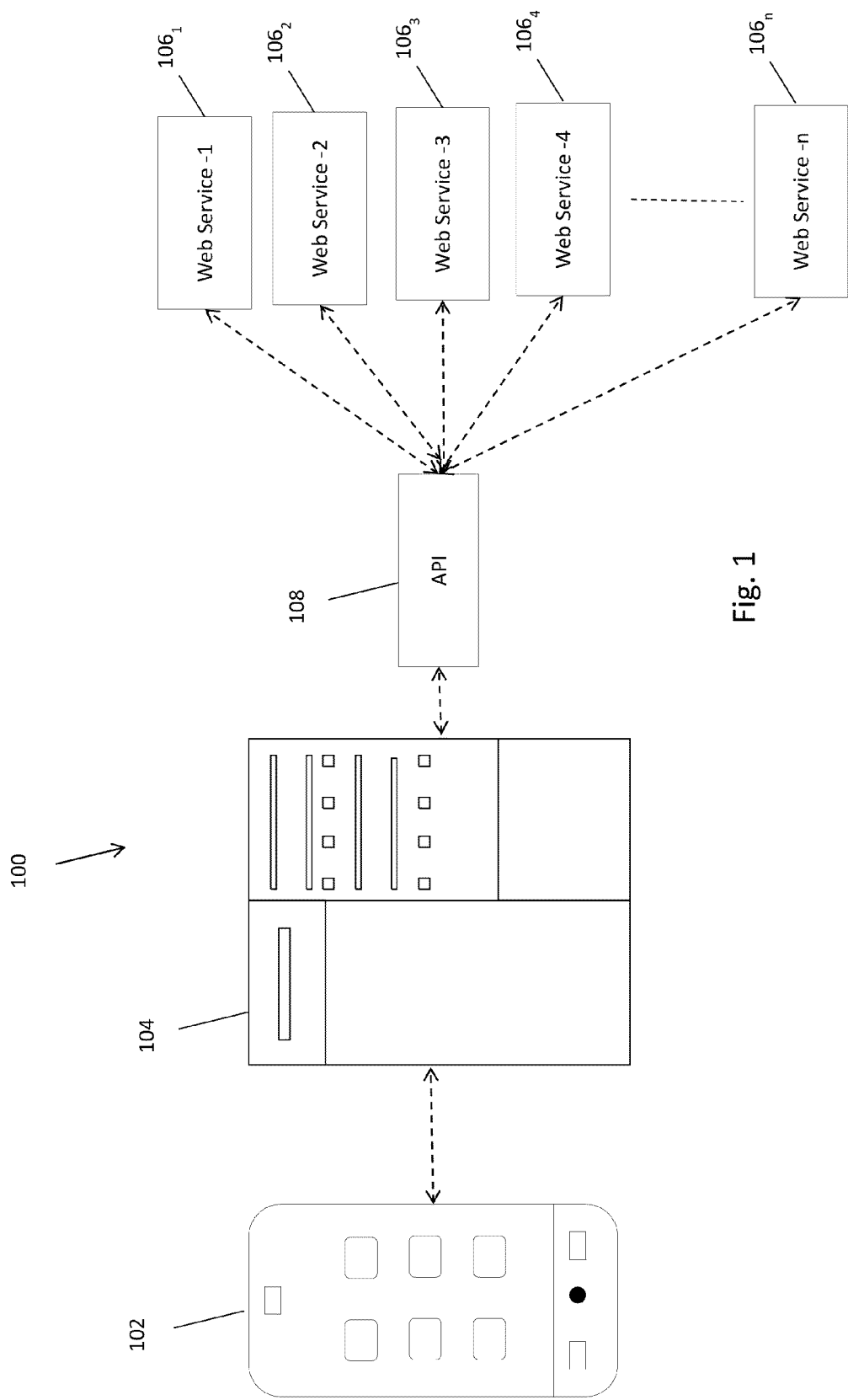
FIG. 1 depicts a diagram illustrates generally, among other things, but not by way of limitation, an exemplary environment in which various embodiments of the present invention may operate.

FIG. 1 is a diagram illustrating generally but not by the way of limitation an exemplary environment in which various embodiments of the present invention may operate. In general, the FIG. 1 describes a high level architecture 100 of the present invention in which various embodiments such as described herein may operate. The architecture 100 may include a system and method for providing assistance to a user in accordance with a request received from the user. The system and method may balance the apparent considerations such as by allowing integration of the user request, often from various semantic web services, in a consistent manner such as for supply of relevant output data to the user. In an embodiment, the system may include a computing device 102 such as to request and receive responses for the request. The computing device 102 described herein may include for example, but not limited to, a telephone, a wireless communicator, a tablet computer, a laptop computer, a personal digital assistant, a desktop computer, a processor with memory, a kiosk, a consumer electronic device, a consumer entertainment device, a smart phone, a music player, a camera, a television, an electronic gaming unit, an electronic device, a mobile device, or the like. The computing device 102 described herein may be configured to include or implement at least a portion of the intelligent automated assistant features or functionalities disclosed herein.

In an embodiment, the computing device 102 may be configured to communicate with other devices, such as clients or servers, over a communications network. The communication network described herein may include one or more wireless communications network or one or more wire line communications network. The wireless communications network may include for example, but not limited to, a digital cellular network, such as Global System for Mobile Telecommunications (GSM) network, Personal Communication System (PCS) network, or any other wireless communications network. The wire line communications network may include for example, but not limited to, the Public Switched Telephone Network (PSTN), proprietary local and long distance communications network, or any other wire line communications network. One or more networks may be included in the communication network and may include both public networks such as the Internet, and private networks and may utilize any networking technology and protocol, such as Ethernet, Token Ring, Transmission Control Protocol/Internet Protocol (TCP/IP), or the like to allow interaction among the various devices.

Further, the computing device 102 may be configured to include a processor, interfaces, a bus, memory, and the like components. The processor described herein may be configured for implementing specific functions associated with the functions of a specifically configured computing device or machine such as to include intelligence in the computing device 102. For example, in one or more embodiments, a user's personal digital assistant (PDA) may be configured or designed to function as an intelligent automated assistant system utilizing processor, memory, or interfaces configure thereon. In an embodiment, the processor may be configured to perform at least one of the different types of intelligent automated assistant functions or operations under the control of software modules or components, which for example, may include an operating system or any appropriate applications software, drivers, or the like.

In an embodiment, the computing device 102 may include or couple to an input device. The input device described herein may be suitable for receiving user input, including for example, but not limited to, a keyboard, touchscreen, microphone, mouse, touchpad, trackball, five-way switch, joystick, or combination thereof. In an embodiment, the user may provide request for assistance via the input device in communication with the computing device 102.

In an embodiment, the system may include one or more servers 104 (hereafter server 104) such as to process the request received from the computing device 102. In an embodiment, the server 104 may be configured to handle the request received from the computing device 102. The computing device 102 and the server 104 may communicate with one another via the communication network and other network protocols such as including for example, but not limited to wired, wireless, or any other protocol. In an embodiment, the server 104 described herein may be configured to interact with one or more semantic web service $106_{1-n}$ (hereafter 106) such as to provide responses to the user in accordance with the request received for the computing device 102. In an embodiment, the server 104 may be configured to include Application Program Interfaces (APIs) 108 such as to interact with the semantic web services 106 to extract the relevant data and respond to the user. In an embodiment, the servers 104 may be configured to call external semantic web services 106 via the API 108 such as to refer or to store data concerning previous interactions with particular users. The communications with semantic web services 106 may take place, for example, via the communication network. The server 104 described herein can be configured to use the API as a service such as to interact with the semantic web services 106.

In various embodiments, the semantic web services 106 described herein may include web-enabled services or functionalities related to or installed on the hardware device itself. In an embodiment, the semantic web services 106 described herein may be provided by third-party service providers, which may be separate from the server 104, and which retains control over the particular data. The third-party service providers described herein may include for example, but not limited to, Facebook, Amazon, Yahoo, eBay, and the like sources. The server 104 may be configured to call the API such as to capture information from the semantic services 106 in accordance with the request received from the computing device 102. In an embodiment, the semantic web services 106 described herein may be implemented on the computing device 102. For example, the server 104 may overlay to an app on the iOS device such as the computing device 102. The server 104 may be configured to call the API such as to obtain information stored in an alarm application ("app"), contacts, calendar, or the like sources.

In an embodiment, the API 108 described herein may be configured to interact with the web services 106 to search for at least one answer or response for the user. In an embodiment, the API 108 may be configured to use one or more search parameters such as for example, but not limited to, search terms (such as food, restaurant, place, and the like), limit parameter to specify the number of response results to be returned in the result set, sort parameter to sort the retrieved results based on the relevancy and ranking, language parameter to search the web services of different languages (Default=en), location parameter to specify the combination of "address, neighbourhood, city, state or zip, optional country, and the like" to be used when searching for user voice request, and the like.

In an embodiment, the server 104 may be configured to include or store one or more web service parameters such for example, but not limited to, web service ID, web service name, web service business type, Uniform resource locator (URL), Mobile URL, review count such as to provide number of users review associated with the web service, categories such as to provide a list of category of elements included in the web service 106 (for example the business elements that the web service may be associated with may include "Home appliances", "Active Life style", "Entertainment", and the like), distance to provide the Distance web service business is from the search location in meters, rating provided by the one or more users for the business or element (such as may ranges from 1, 1.5, . . . 4.5, 5, and the like), location data of the elements of the web service, and the like. In an embodiment, the API 108 may be configured to user the one or more web service parameters such as to call the web service 108 in accordance with the request received from the user.

In an embodiment, the server 104 may be configured to perform operations or functions on the computing device 102 on behalf of the user such as for example, but not limited to, actively interview the user to elicit information or input, interpret user intent, disambiguate among candidate interpretations, request and clarify required information from the user, perform actions based on the user intent, and the like. In an embodiment, the actions described herein may be performed such as for example, by initiating, activating, or interfacing with any semantic web services 106 that may be available, installed, or running on the computing device 102 via the API 108, or by calling services that are available over the communication network such as the Internet via the API 108. In an embodiment, the activation, initiation, interface, or any form of communication with the semantic web services 106 may be performed via the API 108 stored thereon.

Figure 2:
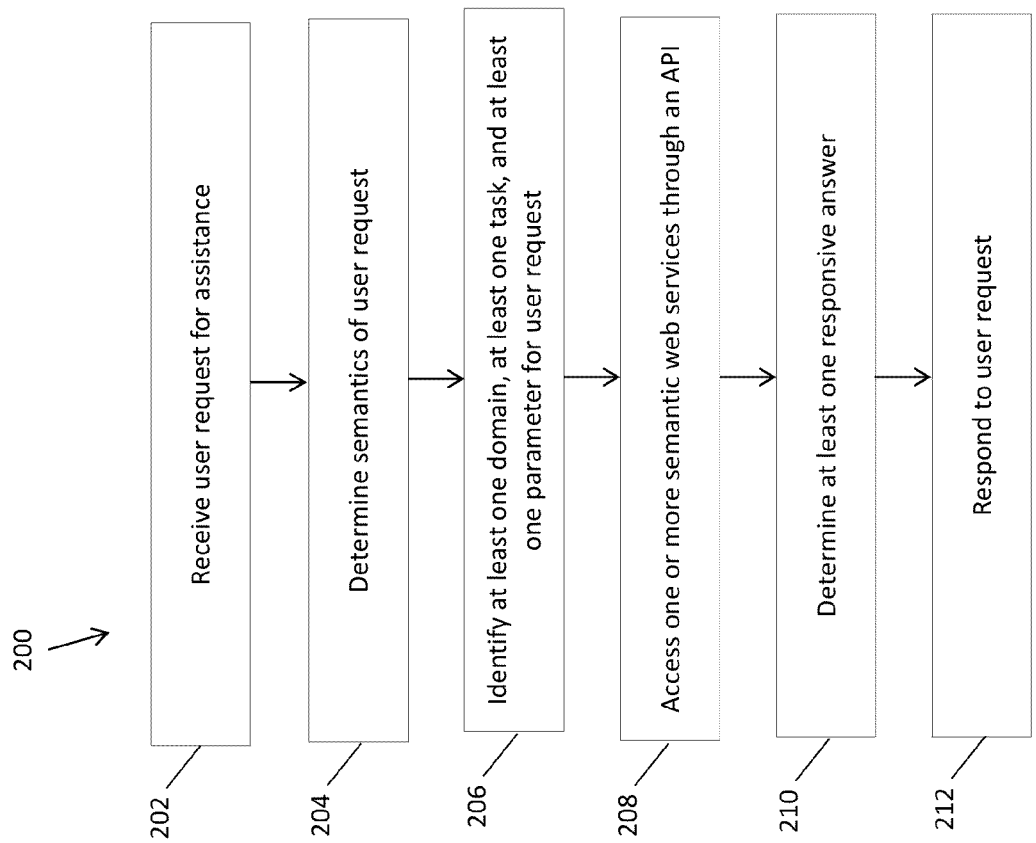
FIG. 2 depicts a diagram illustrating generally, among other things, an example of a method for providing assistance to a user in accordance with an embodiment of the present invention.

FIG. 2 is a diagram illustrating generally, among other things, an example of a method 200 for providing assistance to the user. At 202, the method 200 may allow the server 104 to receive request from the user of the computing device 102. In an embodiment, the user may provide the request through the voice or speech. Examples of different types of input data request which may be accessed or utilized by the computing device 102 may include, but are not limited to, voice input, text input, location information coming from sensors or location-based systems, time information from clocks on client devices, automobile control systems, clicking and menu selection, or any other input.

In an embodiment, the voice data described herein may be provided such as from mobile devices, mobile telephones, tablets, computers with microphones, Bluetooth headsets, automobile voice control systems, over the telephone system, recordings on answering services, audio voicemail on integrated messaging services, consumer applications with voice input such as clock radios, telephone station, home entertainment control systems, game consoles, or any other wireless communication application.

In an embodiment, the text input described herein may be provided from keyboards on computers or mobile devices, keypads on remote controls or other consumer electronic devices, email messages, instant messages or similar short messages, text received from players in multiuser game environments, text streamed in message feeds, or any other text input.

In an embodiment, at 204, the method 200 may allow the server 104 to determine semantics of the user request. The server 104 may be configured to interpret the user voice request such as to determine the semantics of the user request. In an embodiment, the server 104 may be configured to match the word, phrase, or syntax such as to identify at least one task, at least one domain, and at least one parameter of the user request such as shown at 206. The server 104 may be configured to automatically correct the syntactic or semantic errors identified from the user voice request.

In an embodiment, an example of such semantic determination and identification of at least one task, at least one domain, and at least one parameter of the user request via the API 108 is shown below:

```
Context Type: #<semantic-analyze-context context>
char** argv;
Semanticdb [{table (subject, verb, object), dburl1:
"api.semanticdb1.com",
dburl2: "api.semanticdb2.com"}];
semanticdb( )
{
SpeechRecognitionEngine myRecognizer = new
SpeechRecognitionEngine( );
    Grammar testGrammar = CreateTestGrammar( );
    myRecognizer.LoadGrammar(testGrammar);
    // Initial objects creation to test the user voice request
    myRecognizer.SetInputToDefaultAudioDevice( );
    WriteTextOuput("");
    RecognitionResult result = myRecognizer.Recognize( );
    string item = null;
        if (result.Semantics.ContainsKey("domain", "task",
        "parameter"))
        {
    item = result.Semantics["domain", "task",
"parameter"].Value.ToString( );
        WriteTextOuput(String.Format("semantics are '{0}'", item));
        }
}
```

In an embodiment, at 208, the method 200 may allow the server 104 such as to access the one or more semantic web services 106 through the API 108. In an embodiment, the server 104 may control many features and operations of the computing device 102. In an embodiment, the server 104 may interact with the semantic web services 106 such as via the APIs 108 to perform functions and operations that may be initiated using a conventional user interface on the computing device 102. Such functions and operations may include, for example, adding a contact, removing a contact, setting an alarm, making a telephone call, sending a text message or email message, adding a calendar event, providing suggestions to the user, and the like. The functions and operations described herein may be specified by the user, or they may be automatically performed based on the context of the user voice request. One skilled in the art will recognize that the assistant may thereby be used as a control mechanism for initiating and controlling various operations on the computing device 102.

In an embodiment, an example of such access to the one or more semantic web services 106 through the API 108 is shown below:

```
{
api.webservice1.com;
api.webservice2.com;
api.webservice3.com;
.
api.webservicen.com;
}
```

In an example, the user may provide input request via the computing device 102 such as "Remind me about a meeting tomorrow at 2:00 pm". The server 104 may determine the response to the user request, using the techniques described herein. The server 104 may call the semantic web services 106 such as to interface with a calendar application or function on the computing device 102. The server 104 may schedule a reminder in the calendar application of the computing device 102 on behalf of the user. In this manner, the user can get assistance as from the server 104 which may interact with different semantic web services 106 via the API 108. If the user's requests are ambiguous or need further clarification, the server may use various techniques such as for example, but not limited to, active elicitation, paraphrasing, suggestions, and the like, to disambiguate the user voice request information so that the correct semantic web services may be called by the API 108. In one embodiment, server 104 may prompt the user for confirmation of the user request before calling a semantic web service to perform a function or operation, or to extract information. In an embodiment, the user may restate the user request to the user for confirmation before calling a semantic web service to a function or operation, or to extract information.

In an embodiment, at 210, the method 200 may allow the server 104 such as to determine response to the user. The method 200 may call the semantic web services 106 in accordance with the request received from the user. In an example, the user voice request the user may provide input request via the computing device 102 such as "Indian food restaurants around Chicago". The server 104 may determine the response to the user request such as by calling the semantic web services 106 such as to extract information from one or more user generated data. In an example, the server 104 may call the one or more third-party web services 106 such as to capture the user generated data related to the user request. The one or more third-party web services described herein may be separate from the computing device 102 and the server 104. In an embodiment, the server 104 may provide an API call to the related web service 106 such as Amazon, eBay, Facebook, Twitter, and the like to retrieve suggestion and user generated reviews on Indian restaurants around Chicago. The server 104 may be configured to create individual requests for each web services 106 and get responses related to the user request.

In an embodiment, the user voice request may be "Add contact in the contact list". The server 104 may determine the response to the user request such as by calling the semantic web services 106 to interface with a contact application that may be stored, installed or running on the computing device 102. The server 104 may create an API call to the contact application service in the computing device 102 in accordance with the request received from the user.

In an embodiment, at 212, the method 200 may allow the server 104 provide response to the user. In an embodiment, the server 104 may call the API such as to perform an operation or function in the computing device 102, on behalf of the user. For example, the server 104 may add contact information in the contact application of the computing device 102 as a response to the request received from the user. In an embodiment, the server 104 may provide options or information as the response to the user request. For example, the server 104 may extract the review information about the "Indian restaurants in Chicago" and may provide different options of the "Indian restaurants in Chicago" to the user. The information described herein may be extracted from the user generated reviews, ratings, user history, and the like sources.

In an embodiment, an example of such responses received from the web services 106 via the API 108, in accordance with the request received from user such as shown below:

{
Web service1: [{"address1": "342 James street Chicago", "avg_rating": 3.5,
"categories": [
{"name": "restaurants", "search_URL": "api.webservice1.com/search"},
{"name": "Indian Hotels", "search_URL": "api.webservice1.com/search"}]}];
"review_count": 3;
"reviews": [{"webserviceID": "webservice1.review1", "rating": 2.5,
"rating.Img.URL": "api.webservice1.com/ratingimg", "text": "The taste of the curry is average but the delivery service is very quick."}
{"webserviceID": "webservice1.review2", "rating": 3.0,
"rating.Img.URL":
"api.webservice1.com/ratingimg", "text": "The service is good and the food is osam."}
{"webserviceID": "webservice1.review3", "rating": 3.5,
"rating.Img.URL":
"api.webservice1.com/ratingimg", "text": "I rated this hotel as 3.5. I like the service very much. Thought the raita and rice is average but the chole and chatni is good."}]
}

Similarly, server 104 may receive response options from other web services also such as shown below:

{
Web service2: [{"address1": "#32 Brookfield Chicago", "avg_rating": 4.0,
"categories": [
{"name": "Indian restaurants", "search_URL": "api.webservice2.com/search"},
{"name": "Indian Hotels", "search_URL": "api.webservice2.com/search"}]}];
"review_count": 2;
"reviews": [{"webserviceID": "webservice2.review1", "rating": 3.0,
"rating.Img.URL": "api.webservice1.com/ratingimg", "text": "The best part of the meal in the restaurant is Biryani. I like the taste and it is fun to eat"}
{"webserviceID": "webservice2.review2", "rating": 3.5,
"rating.Img.URL":
"api.webservice1.com/ratingimg", "text": "I rated this as 2.5, because the hotel serves only Indian veg. dishes and I am a non-veg. lover. However, I liked the Khichdi."}]
}

Figure 3:
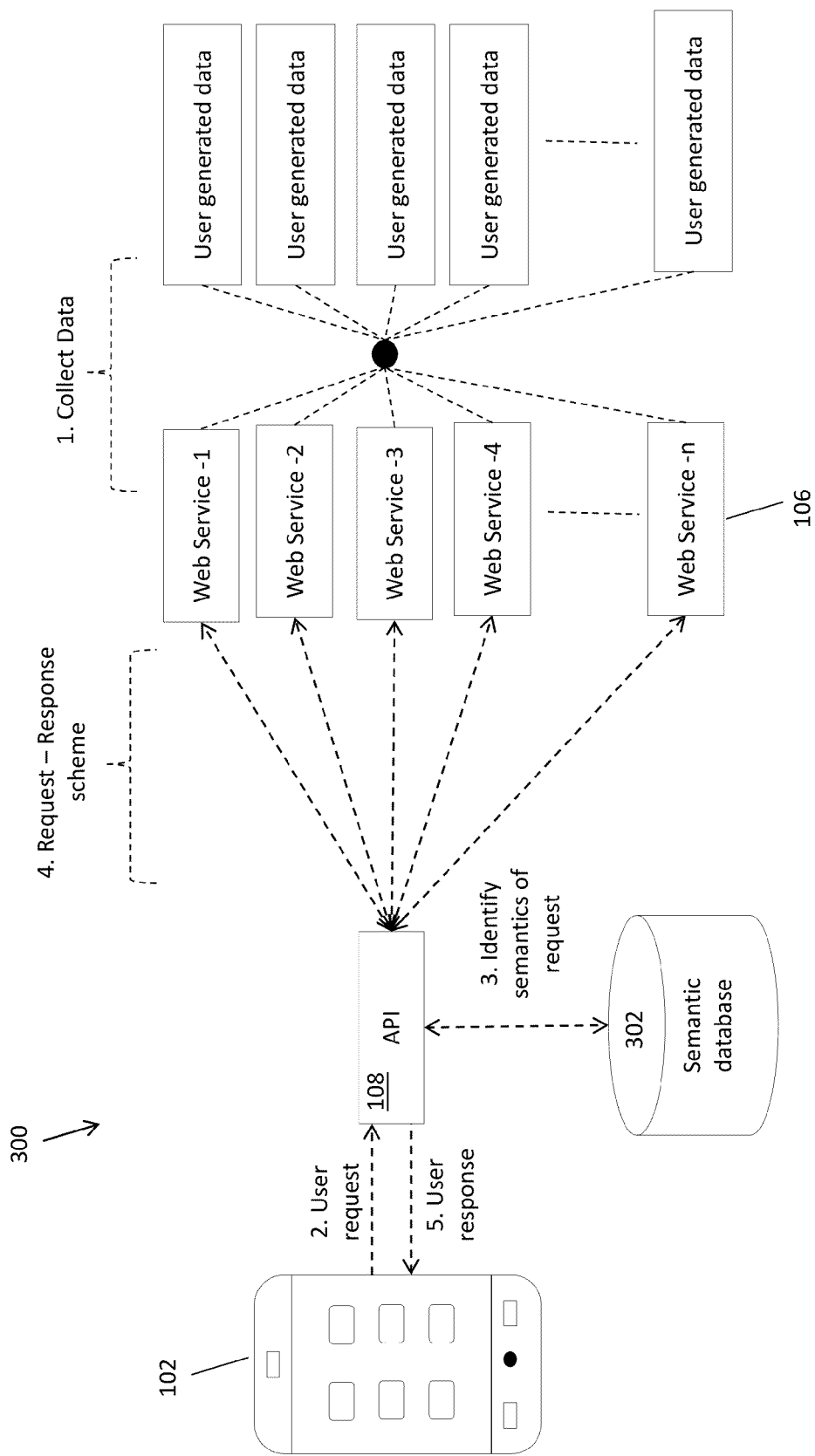
FIG. 3 depicts a diagram illustrating generally, but not by way of limitation, an example of a task flow for providing assistance to a user according to an embodiment of the present invention.

FIG. 3 is a diagram illustrating generally, but not by the way of limitation, an example of a task flow 300 for providing assistance to the user according to an embodiment of the present invention. In an embodiment, the user may request for assistance via the computing device 102. The user may provide the request through voice or speech. Examples of different types of input data request which may be accessed or utilized by the computing device 102 may include, but are not limited to, voice input, text input, location information coming from sensors or location-based systems, time information from clocks on the devices, automobile control systems, clicking and menu selection, or any other input. In an embodiment, the voice data described herein may be provided such as from mobile devices, mobile telephones, tablets, computers with microphones, Bluetooth headsets, automobile voice control systems, over the telephone system, recordings on answering services, audio voicemail on integrated messaging services, consumer applications with voice input such as clock radios, telephone station, home entertainment control systems, game consoles, or any other wireless communication application.

The server 104 may be configured to receive user voice request such as to provide assistance to the user. In an embodiment, the server 104 may be configured to include or implement layers such as a speech-to-text analyzer, a grammar analyzer, and a set of service providers. The speech-to-text analyzer described herein may be a piece of software that takes audio and turns it into text. The system may integrate with the speech-to-text and natural language understanding technology that may be constrained by a set of explicit models of domains, tasks, services, and dialogs. Unlike assistant technology that attempts to implement a general-purpose artificial intelligence system, the embodiments described herein may apply the multiple sources of constraints to reduce the number of solutions to a more tractable size. The focus on specific domains, tasks, and dialogs also makes it feasible to achieve coverage over domains and tasks with human-managed vocabulary and mappings from intent to service parameters.

In an embodiment, the computing device 102, in communication with the server 104 may be configured to use the speech-to-text analyzer such as to convert the user voice request into written text. The converted text may be passed through the grammatical analyzer layer such to create a logical relationship among the user voice request and the converted text. The grammatical analyzer described herein may be configured to implement or provide intelligence to the computing device 102. The grammatical analyzer may correlate the line sequence of lexemes such as words and commands with the formal grammar. For example, if the user spoken voice data is "Here" then the grammatical analyzer creates logical relationships by mapping the word "here" to the current (Global positioning system) GPS position or current location of the user such that proper semantic web service may be called through the API 108. Further, the grammatical analyzer provides assistance to system such as to understand the phrase "my daughter" refers to a contact "Stacey Martin" in the computing device 102. In an embodiment, the grammatical analyzer maps the strings such as "send a message" to an action of creating a new text message such that correct messaging service may be called through the API 108. In an embodiment, the grammatical analyzer described may be configured to search a string for certain key phrases and using those phrases to build up a simple model or useful mapped data such that proper semantic web services may be called through the API 108.

The set of service providers such as including the semantic web service 106, which may be called via the API 108 in accordance with the request received from the user. In an embodiment, the server 104 may issues commands such as to access the one or more web service 106 via the API 108. In an embodiment, the server 104 may be configured to determine the semantics of the user request. In an embodiment, the system may include intelligence beyond simple database applications, such as to determine the semantics of the user request from the user natural voice data request.

For example, if the user provides the statement, such as "Chinese food restaurants" then the computing device 102, in communication with the server 104, may be configured to use the speech-to-text analyzer and the natural language processing techniques such as to parse the user voice data and determine the semantics of the user request. In an embodiment, the computing device 102, in communication with the server 104, may interact with a semantic database 302. In an embodiment, the integration of speech-to-text and natural language understanding technology may be constrained by the set of explicit models of domains, tasks, services, and dialogs, which may allow parsing the user voice statement such as to generate better interpretations of the semantics. In an embodiment, the computing device 102 may not be able to determine accurate interpretations of the semantics of the user request, such as due to ambiguous statements received from the user. This may results in fewer ambiguous interpretations of language, fewer relevant domains, or tasks.

In an embodiment, the server 104 may be configured to disambiguate intent at an early phase of input processing. For example, in an embodiment, where input is provided by speech, a waveform might be sent to the server 104 where words are extracted, and semantic interpretation of the input data may be performed. The results of such semantic interpretation may then be used to drive ambiguous input elicitation, which may offer the user alternative candidate words or options to choose among based on their degree of semantic fit as well as phonetic match.

In an embodiment, the server 104 may use dialog history in interpreting the natural language of user inputs. Because the server 104 may keep track of the user personal history and apply natural language understanding on user inputs. The server 104 may operationalize semantic intent into a strategy for using online semantic web services 106 and executing the strategy on behalf of the user (e.g., operationalizing the desire for a romantic place into the strategy of checking online review sites for reviews that describe a place as "romantic").

The server 104 may be configured to include the API 108 to interact with the one or more semantic web services 106 such as to perform one or more operations or functions in accordance with the request received from the user. In an embodiment, the web services 106 may be configured to provide the functions over the API that would normally be provided by a web-based user interface to a service. For example, a review website might provide a service API that would return reviews of a given entity automatically when called by a program. The API may offer services that a human would otherwise obtain by operating the user interface of the website. In an embodiment, the services 106 may collect the information from the various third party sources such as for example, but not limited to, a set of romantic place listing services that may lists places matching name, location, or other constraints, a set of romantic place rating services that may return rankings for named romantic place, a set of romantic place review services that may return written reviews for the romantic place, a geo-coding service to locate romantic places on a map, a reservation service that enables programmatic reservation of rooms, honeymoon sweets in the romantic place, and the like.

In an embodiment, an example of a retrieving response from the semantic web services 106 via the API 108 is as shown below.

```
{
Web service1: [{"address1": "#22 St. Francisco", "address2": "#56 St.
Marino", "address3": " ", "avg_rating": 4.5,
"categories": [
{"name": "restaurants", "search_URL": "api.webservice1.com/search"},
{"name": "Movie Theatre", "search_URL":
"api.webservice1.com/search"},
{"name": "Hotels", "search_URL": "api.webservice1.com/search"}]}];
"review_count": 2;
"reviews": [{"webserviceID": "t-aisea11", "rating": 3.5,
"rating.Img.URL":
"api.webservice1.com/ratingimg", "text": "I know SF and the place called
XYZ is very romantic to spare time. The lighting and the arrangement of
artificial snow fall will give a very glamorous look to the place."}
{"webserviceID": "M-tuse21", "rating": 4.0, "rating.Img.URL":
"api.webservice1.com/ratingimg", "text": "XYZ is not at all a bad place to
have a good time. Very good food and nice arrangement of flowers in the
park of the XYZ."}]
}
```

In an embodiment, the semantic web services 106 may provide the functions over the API 108, which may be normally be performed by a user interface to an application. For example, a calendar application might provide a service API that would return calendar entries automatically when called by a program. The API 108 offers to computing device 102 the services that a human would otherwise obtain by operating the user interface of the application. In an embodiment, the server 104 may be configured to initiate and control any of a number of different functions available on the computing device 102.

In an embodiment, the server 104 may be configured automatically determine which services from among the one or more services 106 may meet the user's request or specified domain and task in accordance with the request received from the user. The server 104 may be configured to automatically call multiple services, in any combination of concurrent or sequential ordering such as to extract the information related to the user information. In an embodiment, the server 104 may automatically transform task parameters and constraints to meet input requirements of service APIs. In an embodiment, the server 104 may be configured to automatically monitor the semantic web services 106 for the user generated data and gather relevant options from the services 106 in accordance with the request received from the user. In an embodiment, the server 104 may be configured to send a request to one or more semantic web services 106 through the API 108 such as to collect the data related to the user information and merge the related data from various services into a unified result model. The server 104, in communication with the computing device 102, may provide the response including various options, functions, and operations to the user.

Figure 4B:
FIG. 4B depicts a diagram illustrating generally, but not by way of limitation, an example of a use of a calendar API, in accordance with an embodiment of the present invention.
Figure 4A:
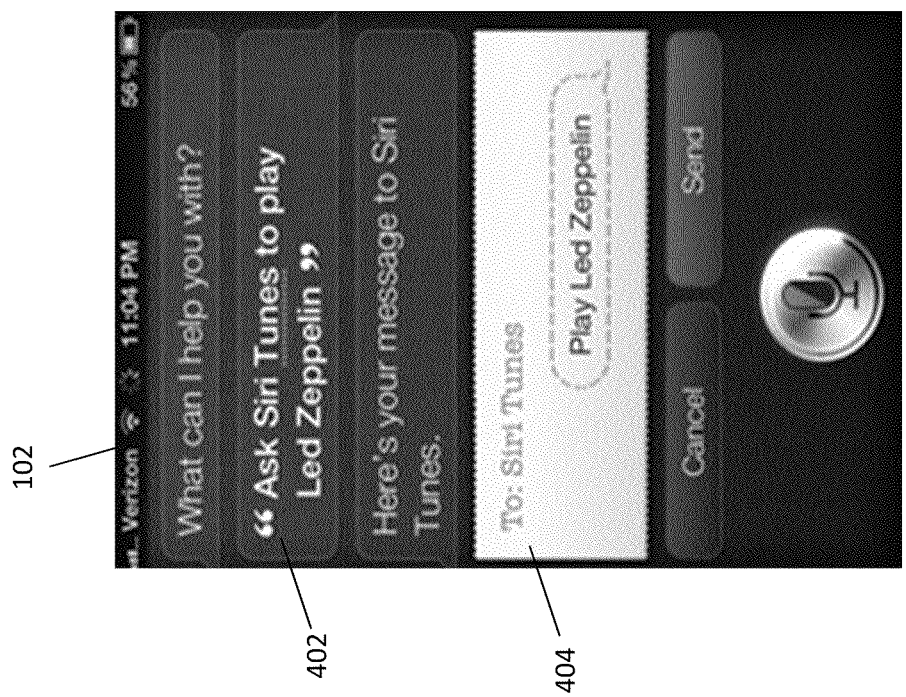
FIG. 4A depicts a diagram illustrating generally, but not by way of limitation, an example of a use of text message API, in accordance with an embodiment of the present invention.

FIG. 4A is a diagram illustrating generally, but not by the way of limitation, an example of a use of text message API in accordance with an embodiment of the present invention. The user in communication with the computing device 102 may send a voice request such as "Ask Seri Tunes to play Led Zepplen" such as shown at 402. In an embodiment, the user may create a contact in the phonebook that may be a natural name and add a phone number of the text system front end using the front end API such that the computing device 102 in communication with the server 104 may automatically perform functions or operations, on behalf of user, upon receiving the request. The server 104 may recognizes the user request and calls the text message API such as to respond to the user by performing operations or actions related to the user voice request.

In an embodiment, the text message API described herein may take advantage of the computing device 102 iOS Phonebook and Text messaging application such as to weld together a useful and elegant way to present the data. The API described herein may have access to a short code text messaging platform or a front end system that can receive text messages and parse the text string in accordance with the request received from the user. In an embodiment, the server 104 may calls the phonebook or contacts application service of the computing device 102 though the API 108 such as to send the request message to the contact stored in the phonebook. The server 104 may be configured to deliver a text message that may be acted or based on the application keywords related to the user voice request. In an embodiment, the server 104 in communication with the computing device 102 may be configured to call the phonebook or contact application via the phonebook or contact API stored thereon, such as to respond to the user request. In an embodiment, the server 104 in communication with the computing device 102 may be configured to call the text messaging application via the text messaging API stored thereon, such as to respond to the user. In an embodiment, the server 104 in communication with the computing device 102 may be configured to create a message and map the message to a contact (such as "Siri Tunes") through the API 108 such as the phonebook API and the text messaging API. In an embodiment, the server 104 in communication with the computing device 102 may be configured to respond to the user request such as by performing the operation or function on the computing device 102. In an embodiment, the computing device 102 in communication with the server 104 may be configured to restate the operation or function for confirmation from the user. For example, the computing device 102 may present the request to the user to confirm the text message before sending it such as shown at 404.

FIG. 4B is a diagram illustrating generally, but not by the way of limitation, an example of a use of a calendar API, in accordance with an embodiment of the present invention. The user in communication with the computing device 102 may provide a voice request such as "Remind me to pick up the milk tomorrow" such as shown at 406. The server 104 may recognizes the user request and calls the calendar API such as to respond to the user by performing operations or actions related to the user voice request. In an embodiment, the server 104 may be configured to use Calendaring Extensions to WebDAV (CalDAV) protocol such as to communicate with the calendar events of the computing device 102. The CalDAV protocol described herein may be defined by RFC allowing multiple user access to the information such as to provide cooperative planning and information sharing. In an embodiment, the CalDAV protocol may be configured to allow the server 104 to access scheduling information on the computing device 102. The server 104 may be configured to read back CalDAV events, even if they have been modified such as to allow the computing device 102, in communication with the server 104, to have a two-way communication via the API for transferring data in and out of the computing device 102.

In an embodiment, server 104 may recognizes the user voice data and calls the calendar application of the computing device 102 via the calendar API. In an embodiment, the computing device 102 in communication with the server 104 may be configured to schedule reminders on the calendar application of the computing device 102 via the calendar API. In an embodiment, the server 104 in communication with the computing device 102 may be configured to respond to the user request such as by performing the operation or function on the computing device 102. In an embodiment, the computing device 102 in communication with the server 104 may be configured to restate the operation or function for confirmation from the user. For example, the computing device 102 may present the user to confirm the reminder, which is scheduled on behalf of the user in accordance with the user voice request such as shown at 408.

Figure 5:
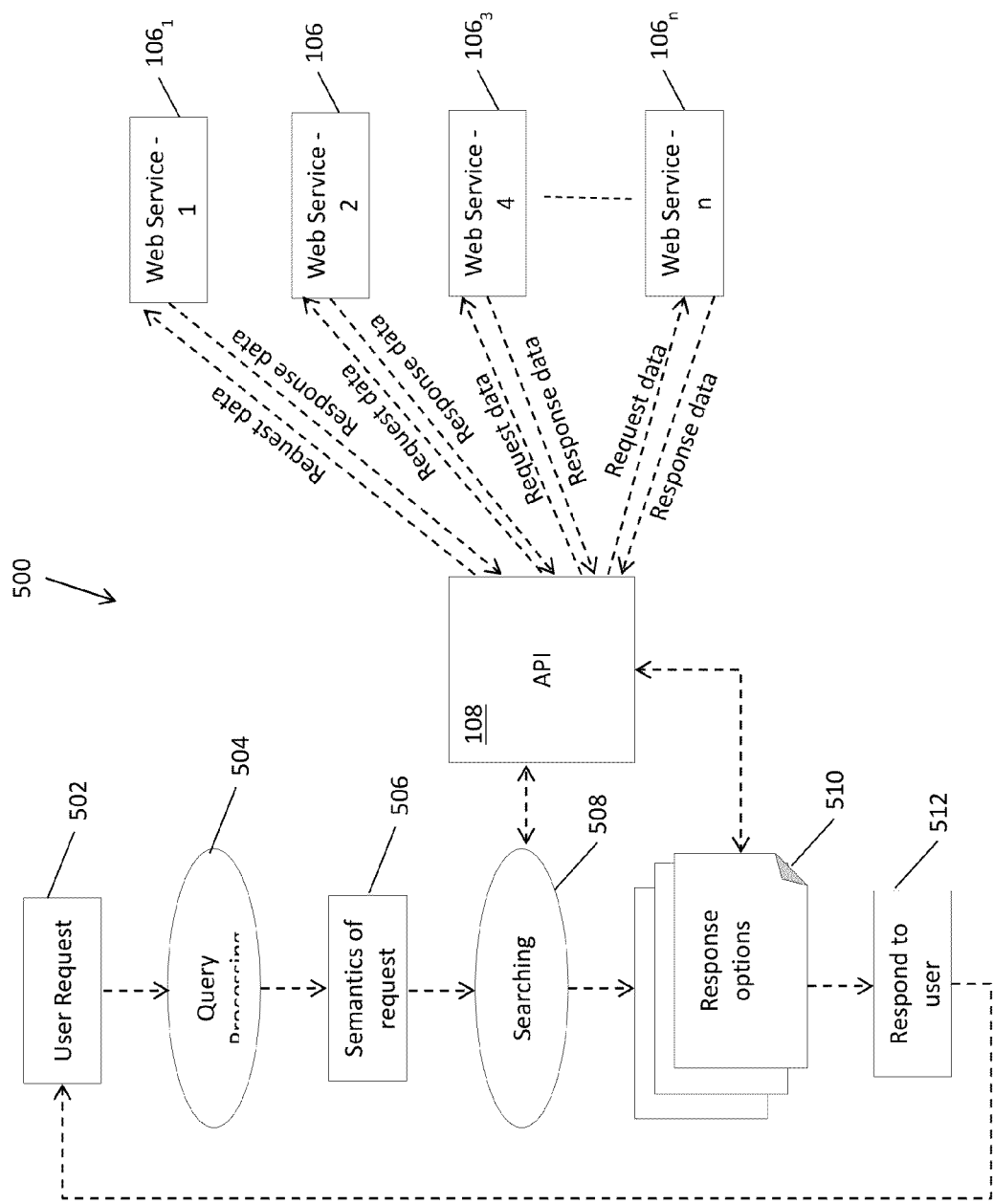
FIG. 5 depicts a diagram illustrating generally, but not by way of limitation, an example of a method for processing a user request in accordance with various embodiments of the present invention.

FIG. 5 is a diagram illustrating generally, but not by way of limitation, an example of a method 500 for processing the user request in accordance with various embodiments of the present invention. At 505, the method 500 may allow the user to provide voice request via the computing device 102. At 504, the method 500 may include a query processor such as to process the request received from the user, which may provide a way to generate a choice set by creating a query related to the user request. At 506, the method 500 may allow the server 104 to determine semantics of the user request. In an embodiment, the server 104 may execute the queries such as to determine the semantics of the user request and identify the at least one domain, at least one task, and at least one parameter for the user request. In an embodiment, the method 500 may identify for the at least one matching domain, task and parameter from one of: a semantic hotel database, a semantic restaurant database, a semantic local event database, semantic concert database, a semantic media database, a semantic book database, a semantic music database, a semantic travel database, a semantic flight database, and the like.

At 508, the method 500 may allow the server 104 to search for the response data related to the user request. The computing device 102 may be configured to enable the operation of applications and services via natural language processing techniques that may be otherwise provided by dedicated applications with graphical user interfaces including search, such as for example, but not limited to, location-based search, navigation such as maps and directions, database lookup such as finding businesses or people by name or other parameters, getting weather conditions and forecasts, checking the price of market items or status of financial transactions, monitoring traffic or the status of flights, accessing and updating calendars and schedules, managing reminders, alerts, tasks and projects, communicating over email or other messaging platforms, or operating devices locally or remotely. In an embodiment, the computing device 102 may be configured to initiate, operate, or control many functions or apps available on the device.

The server 104 may be configured to include the API 108 such as to request data from the one or more semantic web service 106. In an embodiment, the semantic web services 106 described herein may include Resource Description Framework (RDF). In an embodiment, the semantic web services 106 described herein may include e web ontology language. In an embodiment, the server 104 may be configured to retrieve answers from web services 106, which may include collecting user generated data, such as to provide at least one response to the user voice request.

The server 104 may be configured to automatically invoke the semantic web services 106 through the API 108 on behalf of the user. In an embodiment, the services 106 may be called dynamically while responding to the user's request. In an embodiment, multiple instances or threads of the services may be concurrently called. In an embodiment, the services 106 may be called over the communication network using APIs 108, or over the communication network using web service APIs, or any combination thereof. In an embodiment, the rate at which services are called is programmatically limited and managed by the server 104 in communication with the computing device 102.

In an embodiment, the semantic web service invocation may be used, such as for example, to obtain additional information or to perform tasks in accordance with the request received from the user. In an embodiment, the request parameters are transformed as appropriate to the service's API. The server 104 may be configured to send request to each of the individual semantic web service 106 such as by calling the semantic web service 106. The semantic web services 106 may be configured to include various suggestions, reviews, ratings, feedback, and the like information related to the user request such that the server 104 may collect the information and provide response to the user. In an embodiment, the server 104 may be configured to determine whether the current response list received from the one or more semantic web services 106 is sufficient, such as for example, if the response list include fewer than the desired number of matching elements, then the server 104 may be configured to extend the search results such as by extending task parameters. For example, if the number of "romantic places" of the desired sort found within N miles of the target location is too small, then extension would run the request again, looking in an area larger than N miles away. Once responses are received from the service, the responses may be transformed to a response representation for presentation to the user within computing device 102.

In an embodiment, services invoked by the server 104 through the API 108 may be a third-party web service, application running on the computing device 102, operating system function, or the like. In an embodiment, the server 104 may be configured to transform the at least one identified task into a form that may be used by at least one service such as to provide response data to the computing device 102. In an embodiment, the server 104 may be configured to offer the at least one identified parameters to the semantic web services 106 as APIs or databases, which may differ from the data representation used in task requests. In an embodiment, the server 104 may be configured to accordingly map the at least one task parameter in the one or more corresponding formats and values by at least one semantic web service 106 being called through the API 108. The server 104 may then retrieve the user generated data from the semantic web services 106 though the API 108. In an embodiment, the server 104 may be configured to perform an operation or function on the computing device 102 such as by invoking an semantic web service 106 stored, installed, or implemented on the computing device 102 though the API 108, in accordance with the request received from the user.

At 510, the method 500 may allow the sever 104 to provide the possible response options to the user. The server 104 may collect the possible responses from the semantic web services 106, which may be validated and merged. For example, lists of "romantic places" from different providers of places may be merged and duplicates may be removed. In an embodiment, the criteria for identifying the duplicates may include for example, but not limited to, fuzzy name matching, fuzzy location matching, fuzzy matching against multiple properties of domain entities, such as name, location, phone number, or website address, or any combination thereof. In an embodiment, the server 104 may be configured to sort and trim the response data collected from the semantic web services 106 such as to return a list of response options of the desired length to the user.

In an embodiment, the computing device 102, in communication with the server 104, may be configured to present the possible responses to the user such as to select the desired candidate response. For example, if the user request is "Romantic place around Italy", then the server 104 may interact with the semantic web services 106 such as by calling the services 106 through the API 108. The server 104 may extract all possible options or suggestion from the semantic web services 106 through the API 108. The server 104 may then allow the computing device 102 to present the possible options related to the user request. The computing device 102 may present different options of the "Romantic places around the Italy". The server 104 may output the data returned by the services 106 to the computing device 102 such as to allow the user to select the desired related candidate option.

In an embodiment, the computing device 102, in communication with the server 104, may be configured to present the possible responses to the user for confirmation. For example, if the user request is "send good morning message to my wife". The server 104 may be configured to call the messaging and phonebook services of the computing device 102 through the API 108. The server 104 may create a text message including the text "Good morning" and map the message in the contact "wife and associated number" via the text messaging API and the phonebook API. The computing device 102, in communication with the server 104, may be configured to restate the created message to the user for confirmation. At 512, the method 500 may allow the computing device 102 to receive confirmation from the user. In an embodiment, the computing device 102, in communication with the server 104, may be configured to perform an operations or functions such as by scheduling meetings, creating reminders, checking stocks, sports scores, and the weather, sending message, and the like.

Figure 6:
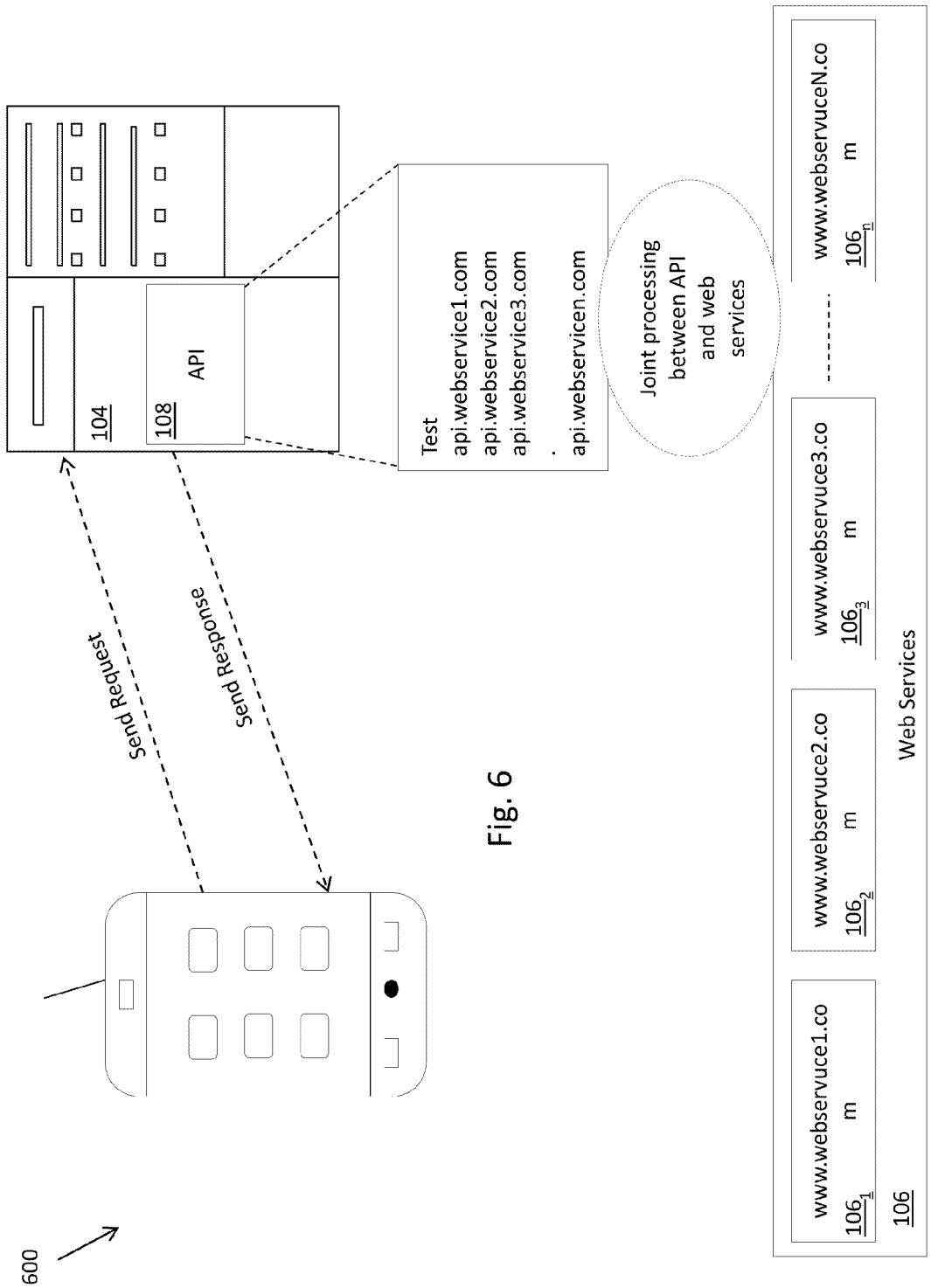
FIG. 6 is a diagram illustrating generally, among other things, an example of a system or method for semantic web service integration and testing, in accordance with various embodiments of the present invention.

FIG. 6 is a diagram illustrating generally, among other things, an example of system or method 600 for semantic web service integration such as to provide one or more response options to the user, in accordance with various embodiments of the present invention. In an embodiment, the system 600 may include an API module 108 (or simply API 108) such as to interact with one or more semantic web services 106. The server 104 may be configured to include one or more reference addresses of the semantic web services 106. The reference addresses described herein may include for example, Uniform Resource Locators (URLs), unique identifiers of the semantic web services 106, and the like. For example, the server 104 described herein may include reference to the semantic web service such as www.webservice1.com, www.webservice2.com, www.webservicen.com, and the like. The reference addresses described herein may be integrated with the API such as api.webservice1.com, api.webservice2.com, api.webservicen.com, and the like such that the one or more semantic web services 106 may be invoked by the server 104 via the API 108. The server 106 may configured to constantly update the reference addresses of the web services 106 such as to actively capture information from the semantic web services 106.

In an embodiment, semantic web services providers may be configured to provide or update initial setup and reference addresses of the web services 106 to the server 104. The reference addresses may be directly directed to the web services or may be redirected from one web service to the other web service. In an embodiment, the server 104 may be configured to implement one or more service-specific rules. The API 108 may interface with the service-specific rules such as to learn how long the responses or results should be retrieved from the semantic web services 106, how long the API 108 should be engaged with the semantic web services 106, how may records or how much data is expected from each semantic service, and the like. In an embodiment, the server 104 may configure the API 108 to interface or communicate with one or more protocols such as to retrieve responses from the semantic web services 108. In an embodiment, the protocols described herein may include for example, but not limited to, File Transfer Protocol (FTP), Hyper Text Transfer Protocol (HTTP), and the like. Further, the service-specific rules may configure the server 106 to learn how long to retrieve at least one response from the semantic web services 106 via the API 108, how long to wait before retrieving at least one response from the semantic web services 106 via the API 108, how much information to be retrieved from the semantic web services 106 via the API 108, how long should the size or date of the response information be fixed before it is considered complete, and the like.

In an embodiment, the server 104 may authenticate the request to or from the API 108 such as to provide security and avoid unauthorized communications within the system. The sever 104 may be configured to include one or more authentication parameters such as for example, but not limited to, authentic web service key parameter, authentication token parameter generated by the server 104 for each request to or form web service 106, authentication signature parameter, authentication timestamp parameter, and the like. These parameters may be passed in the Hyper Text Transfer Protocol (HTTP) authorization header, as URL query keys, or in the POST data such as to implement security mechanisms in the system.

Figure 7:
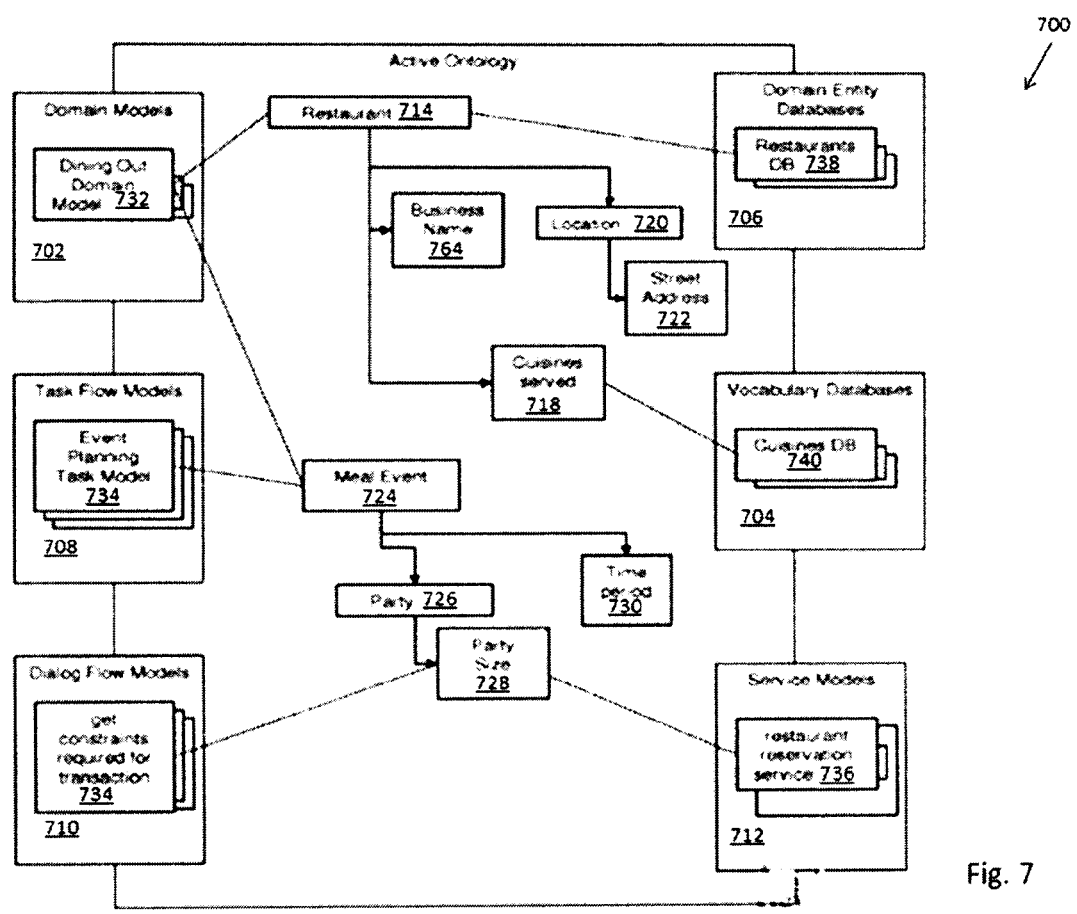
FIG. 7 depicts a diagram illustrating generally, but not by way of limitation, an example of a portion of ontology associated with semantic web services in accordance to an embodiment of the present invention.

FIG. 7 is a diagram illustrating generally, but not by way of limitation, an example of a portion of ontology 700 associated with the semantic web services 106, in accordance to an embodiment of the present invention. The ontology 700 described herein may serve as a unifying infrastructure that integrates models, components, or data from other parts of embodiments of system. In general, in the field of computer and information science, the ontologies may provide structures for data and knowledge representation such as classes or types, relations, attributes or properties and their instantiation. In an embodiment, the FIG. 7 illustrates the operation or functions provided by the ontology 700. The Ontologies 700 described herein may be used, for example, to build models of data and knowledge. In an embodiment, the ontology 700 may serve as an execution environment, in which distinct processing elements are arranged in an ontology-like manner, such as for example having distinct attributes and relations with other processing elements.

In an embodiment, the ontology 700 may be operable to perform or implement various types of functions, operations, actions, or other features such as to model and develop environment, such as including domain models 702, vocabulary databases 704, domain entity databases 706, task flow models 708, dialog flow models 710, service capability models 712. In an embodiment, the ontology 700 may be operable to perform or implement data-modeling environment on which ontology-based editing tools may operate such as to develop new models, data structures, database schemata, representations, and the like.

In an embodiment, the ontology 700 may include representations of a restaurant and meal event. In an example, a restaurant may be a class or concept 714 with properties such as the restaurant name 716, cuisines served 718 in the restaurant, and its location 720, which in turn might be modeled as a structured node with properties for street address 722. The concept of a meal event might be modeled as a node 724 including a dining party 726, which may has a size 728 and time period 730.

The ontology 700 may include or make reference to domain models 702. For example, FIG. 7 depicts a dining out domain model 732 linked to restaurant concept 714 and meal event concept 724. In an instance, the ontology 700 includes the dining out domain model 732, which specifically includes at least two nodes of the ontology 700 such as restaurant 712 and meal event 724 respectively. The domain model represents, among other things, the idea that dining out involves meal event that occur at restaurants.

In an embodiment, the ontology 700 may include or make reference to the task flow models 708. For example, FIG. 7 depicts an event planning task flow model 734, which may model the planning of events independent of domains, applied to a domain-specific kind of event: the meal event 724. In an embodiment, the ontology 700 may include general event planning task flow model 734, which comprises nodes representing events and other concepts involved in planning them. The ontology 700 may also include the node meal event 724, which is a particular kind of event. In an example, meal event 724 may be included or made reference to by both the domain model 702 and the task flow model 704, and both of these models are included in or referenced by the ontology 700.

In an embodiment, the ontology 700 may include or make reference to the dialog flow models 710. The ontology 700 may provide a framework for relating and unifying various components such as the dialog flow models 710. The dialog flow model 710 may operate at the abstraction of constraints, independent of domain. In an embodiment, the present system may uses the ontology 700 to unify the concept of constraint in the dialog flow model 736 as part of a cluster of nodes representing meal event concept 724, which is part of the domain model 702 for dining out.

In an embodiment, the ontology 700 may include or make reference to service models 712. For example, FIG. 7 depicts a model of a restaurant reservation service 736 associated with the dialog flow step for getting values required for that service to perform a transaction. In an instance, service model 712 for a restaurant reservation service specifies that a reservation requires a value for party size 728. The concept party size 728, which is part of the ontology 700, may also be linked or related to a general dialog flow model 710 for asking the user about the constraints for a transaction.

In an embodiment, the ontology 700 may include or make reference to domain entity databases 706. For example, FIG. 7 depicts a domain entity database of restaurants 712 associated with restaurant node 714 in the ontology 700. The ontology 700 may represent the general concept of restaurant 712, as may be used by the various components of the present system, and it may be instantiated by data about specific restaurants in restaurant database 738. In an embodiment, the ontology 700 may include or make reference to vocabulary databases 704. For example, FIG. 7 depicts the vocabulary database of cuisines 740 such as Italian, French, and the like, and the words associated with each cuisine such as "French", "continental", "provincial", and the like. In an embodiment, the ontology 700 may include restaurant node 714, which is related to cuisines served node 718, which is associated with the representation of cuisines in cuisines database 740. A specific entry in database 740 for a cuisine, such as "French", is thus related through the ontology 700 as an instance of the concept of cuisines served 718.

In an embodiment the ontology 700 may include or make reference to any database that can be mapped to concepts or other representations in ontology 700. The domain entity databases 706 and vocabulary databases 704 are merely two examples of how the ontology 700 may integrate databases with each other and with other components of present system. The ontology may allow author, designer, or system builder to specify a nontrivial mapping between representations in the database and representations in the ontology 700. For example, the database schema for restaurants database 738 may represent a restaurant as a table of strings and numbers or as a projection from a larger database of business, or any other representation suitable for database 738. In an example, the ontology 700, restaurant 712 is a concept node with properties and relations, organized differently from the database tables. In an example, nodes of ontology 700 may be associated with elements of database schemata. The integration of database and ontology 700 may provide a unified representation for interpreting and acting on specific data entries in databases in terms of the larger sets of models and data in the ontology 700. For example, the word "French" may be an entry in cuisines database 740. Because, in this example, database 740 may be integrated in the ontology 700, that same word "French" may also has an interpretation as a possible cuisine served at a restaurant, which is involved in planning meal events, and this cuisine serves as a constraint to use when using restaurants reservation services, and so forth. The ontology 700 may thus integrate databases into the modeling and execution environment to inter-operate with other components of system. In an embodiment, the ontologies 700 may be embodied as, for example, configurations of models, databases, and components in which the relationships among models, databases, and components may such as for example, interface over APIs, both internal to a program and between programs.

A diagram illustrates generally, but not by way of limitation, an example of a method 800 for assistance to the user based on user profile information in accordance to an embodiment of the present invention. In an embodiment, at 802, the method 800 may allow the computing device 102 to receive user request for assistance. In an embodiment, the user request may include information or data from the user, which may be used by the computing device 102, in communications with the server 104, such as to determine the user intent. The information or data described herein may include for example, but not limited to, sequences of words, identity of gestures, Graphical User Interface (GUI) components involved in providing the request, current context of dialog, current device application, current data objects, and the like. In an embodiment, the computing device 102 may be configured to use dynamic data about the user such as for example, but not limited to, user location, time, profile, recent activities, and the like.

In an embodiment, at 804, the method 800 may allow the computing device 102, in communication with the server 104, to determine the user intent in accordance with the request received from the user. The computing device 102 may analyze the user request such as to identify a set of syntactic contents of the user request. The syntactic contents of the user described herein may be used to associate data in the user request with structures that represent syntactic parts of speech, clauses, and phrases. The syntactic content may include multiword names, sentence structure, and other grammatical graph structures such as to determine the user intent, in accordance with the request received from the user.

In an embodiment, the computing device 102, in communication with the server 104, may parse the information associated in the user request such as to identify words, phrase, concept, relationship, properties, entities, quantities, propositions, or other representations of meaning or interpretation of the user request such as to identify the user intent. In an embodiment, these the user intent may be represented by set of elements, instances of models, or databases, nodes, or the like in the ontologies such as described in FIG. 7. In an embodiment, the method 800 may allow the computing device 102 to determine semantics of the user request. The computing device 102, in communication with the server 104 may be configured to interpret the spoken voice of the user or other information associated with the user request such as to determine the semantics of the user request. In an example, the server 104 may be configured to match the word, phrase, or syntax such as to identify at least one task, at least one domain, and at least one parameter in accordance with the request received from the user.

In an embodiment, at 806, the method 800 may allow the computing device 102 to interview the user to elicit profile and interests in accordance with the request received from the user. In an embodiment, the server 104 may include or implement using any of a number of different platforms APIs such as to interview the user to elicit profile and interests. The requests interviewing the user to elicit profile and interests may be presented to the user via the computing device 102. In an example, the server 104 may engage short or long term such that such as to access the profile and interests, other previous events and communications within a given session. In an embodiment, the server 104 may interview the user profile information and interest such as to better interpret the semantics of the user request. In an embodiment, the server 104 may uses the user profile and interest such as to provide responses to the user in accordance with the request received from the user.

In an embodiment, at 808, the method 800 may allow the computing device 102 such as to access the one or more semantic web services 106 through the API 108. In an embodiment, the server 104 may control many features and operations of the computing device 102. In an example, the server 104 may interact with the semantic web services 106 such as via the APIs 108 to perform functions and operations. The functions and operations described herein may be specified by the user, or they may be automatically performed based on the context of the user request.

In an embodiment, the computing device 102, in communication with the server 104, may be configured to call the semantic web services 106 such as to receive response for the user in accordance with the request received from the user. In an embodiment, the computing device 102, in communication with the server 104, may be configured to send request to extract information related to the user request via the API 108. In an embodiment, the computing device 102, in communication with the server 104, may be configured to call the one or more third-party web services via the API 108 or may be configured to initiate one or more services running on the computing device 102 via the API 108. The computing device 102 may be configured to receive the responses related to the user request via the API 108. In an embodiment, the services described herein may be configured to use the information about the user profile and interest such as to provide response(s) to the user in accordance with the request received from the user.

In an embodiment, at 810, the method 800 may allow the computing device 102 to suggest options relevant to the user request based on user profile and interest. In an embodiment, the computing device 102, in communication with the server 104, gather responses from the semantic web services 106 and present to the user via the API 108. In an embodiment, at 812, the method 812 may allow the computing device 102 to determine at least one responsive answer. The computing device 102, in communication with the server 104, may be configured to determine at least one responsive answer, in response to receiving a user desired response selected from the set of candidate responses provided to the user.

Next is discussed an example of a method 900 for providing at least one response option to the user in accordance to an embodiment of the present invention. In an embodiment, the method 900 may allow the computing device 102 to receive user request for assistance. In an embodiment, at 902, the method 900 may allow the computing device 102, in communication with the server 104, to determine the user intent in accordance with the request received from the user. The computing device 102 may analyze the user request such as to identify a set of syntactic contents of the user request. The syntactic contents of the user described herein may be used to associate data in the user request with structures that represent syntactic parts of speech, clauses, and phrases. The syntactic content may include multiword names, sentence structure, and other grammatical graph structures such as to determine the user intent, in accordance with the request received from the user.

In an embodiment, the computing device 102, in communication with the server 104, may parse the information associated in the user request such as to identify words, phrase, concept, relationship, properties, entities, quantities, propositions, or other representations of meaning or interpretation of the user request such as to identify the user intent. In an embodiment, these the user intent may be represented by set of elements, instances of models, or databases, nodes, or the like in the ontologies 700 such as described in FIG. 7.

In an embodiment, the computing device 102, in communication with the server 104, may determine ambiguity or may result in ambiguous or different user intent representation. In an example, if the request from the user includes a word that can refer to multiple things, like "pi", which is a well-known mathematical constant but, is also the name of a movie. Similarly, other examples can be the meaning of a unit abbreviation like "m", which could be meters or minutes. In an embodiment, the method 900 may allow the computing device 102 to use data from the structure of active ontology 700 such as to disambiguate the user request and determine the accurate interpretation of user intent. In an embodiment, the connections between nodes in the active ontology 700 may facilitate the computing device 102 to disambiguate among candidate semantic interpretation of user intent.

In an embodiment, the method 900 may allow the computing device 102 to determine semantics of the user request. The computing device 102, in communication with the server 104 may be configured to interpret the user request such as to determine the semantics of the user request. In an example, the server 104 may be configured to match the word, phrase, or syntax such as to identify at least one task, at least one domain, and at least one parameter in accordance with the request received from the user.

In an embodiment, at 904, the method 900 may allow the computing device 102 such as to access the one or more semantic web services 106 through the API 108. In an embodiment, the server 104 may control many features and operations of the computing device 102. In an example, the server 104 may interact with the semantic web services 106 such as via the APIs 108 to perform functions and operations. The functions and operations described herein may be specified by the user, or they may be automatically performed based on the context of the user request. In an embodiment, the functions and operations described herein may be performed such as for example, by initiating, activating, or interfacing with any semantic web services 106 that may be available, installed, or running on the computing device 102 via the API 108, or by calling services that are available over the communication network such as the Internet via the API 108. In an embodiment, the activation, initiation, interface, or any form of communication with the semantic web services 106 may be performed via the API 108 stored thereon.

In an embodiment, the computing device 102, in communication with the server 104, may be configured to call the semantic web services 106 such as to receive response for the user in accordance with the request received from the user. In an embodiment, the computing device 102, in communication with the server 104, may be configured to send request to extract information related to the user request via the API 108.

In an embodiment, the computing device 102, in communication with the server 104, may be configured to call the one or more third-party web services via the API 108. For example, if the user request includes "Reserve a table for dinner" then the one or more semantic web services 106 may be called via the API 108 such as to generate one or more responses to the user. In an example, the server 104 may be configured to call the third-party web services 106 such as to capture the information related to the user request.

In an embodiment, the computing device 102, in communication with the server 104, may be configured to call or initiate one or more services running on the computing device 102 via the API 108. For example, if the user request includes "Remind me about a Meeting" then the one or more semantic web services 106 that are running on the computing device 102 may be called via the API 108 such as to provide response to the user.

In an embodiment, at 906, the method 900 may allow the computing device 102, in communication with the server 104, to retrieve answers from the web services 106. In an embodiment, the semantic web services 106 may be configured to include user generated data, ratings, and the like information such as to provide responses to the user. In an embodiment, the computing device 102, in communication with the server 104, may be configured to send request to the semantic web services 106 to retrieve answers related to the user request. In an embodiment, the computing device 102 may receive the user generated recommendations via recommendation engine 912. The recommendation engine 912 described herein may be configured or designed to include functionality for identifying, generating, or providing personalized recommendations for activities, products, services, source of entertainment, time management, or any other kind of recommendation related to the user request. In an embodiment, at 908, the computing device 102 may be configured to present the available options that match user request. In an example, the server 104 may be configured to receive response options including the list of hotels and table's availability from the semantic web services 106. The server 104 may present the available options to the user via the computing device 102 such as shown at 910.

In an embodiment, at 914, the method 900 may allow the user to select desired candidate response from the set of available options or responses provided to the user. In an embodiment, the user may select the option via the input device such as to indicate the user desired option to the computing device 102. In an embodiment, the computing device 102, in communication with the server 104, may be configured to perform operations or functions desired by the user. In an embodiment, at 916, the computing device 102 may obtain ticket, pass or reservation based on the user request. For example, in response to receiving the user desired option, the computing device 102 may book table in the user desired hotel for dinner on behalf of the user. In an embodiment, the computing device 102 schedule meetings, create reminders, check stocks, sports scores, weather, and the like in response to receiving the confirmation from the user.

Next is discussed an example of a method 1000 for providing at least one response option to the user based on user location information, in accordance to an embodiment of the present invention. In an embodiment, the method 1000 may allow the computing device 102 to receive user request for assistance. In an embodiment, at 1002, the method 900 may allow the computing device 102, in communication with the server 104, to determine the user intent in accordance with the request received from the user. The computing device 102 may analyze the user request such as to identify a set of syntactic contents of the user request. In an embodiment, the computing device 102, in communication with the server 104, may parse the information of the user request such as to identify words, phrase, concept, relationship, properties, entities, quantities, propositions, or other representations of meaning or interpretation of the user request such as to identify the user intent. In an embodiment, these the user intent may be represented by set of elements, instances of models, or databases, nodes, or the like in the ontologies 700 such as described in FIG. 7.

In an embodiment, the computing device 102, in communication with the server 104, may be configured to provide perform operations or functions on the computing device 102 on behalf of the user. In an embodiment, computing device 102, in communication with the server 104, may be to be configured to perform operations, functions such as for example, but not limited to, actively interview the user to elicit information or input, interpret user intent, disambiguate among candidate interpretations, request and clarify required information from the user, perform actions based on the user intent, and the like.

In an embodiment, at 1004, the method 100 may allow the computing device 102 such as to access the one or more semantic web services 106 through the API 108. In an embodiment, the server 104 may control many features and operations of the computing device 102. In an embodiment, the functions and operations described herein may be performed such as for example, by initiating, activating, or interfacing with any semantic web services 106 that may be available, installed, or running on the computing device 102 via the API 108, or by calling services that are available over the communication network such as the Internet via the API 108. In an embodiment, the activation, initiation, interface, or any form of communication with the semantic web services 106 may be performed via the API 108 stored thereon.

In an embodiment, at 1006, the method 1000 may allow the computing device 102, in communication with the server 104, to retrieve answers from the web services 106. In an embodiment, the semantic web services 106 may be configured to include user generated data, ratings, and the like information such as to provide answers or responses to the user. In an embodiment, the computing device 102, in communication with the server 104, may be configured to send request to the semantic web services 106 to retrieve answers related to the user request. In an embodiment, the method 1000 may allow the computing device 102 to determine the location of the user such as shown at 1008. In an embodiment, the computing device 102, may determine the location information via the sensors or location-based systems such as for example, Global Positioning System (GPS), Assisted GPS (A-GPS), and the like installed or configured on the computing device 102. In an embodiment, location information may be combined with the user intent such as to provide location based responses to the user. In an embodiment, responses to the user may be personalized based on the user location information such as user at home, office, park, and the like locations.

In an embodiment, the computing device 102 may receive the user generated recommendations via the recommendation engine 912. The recommendation engine 912 described herein may be configured or designed to include functionality for identifying, generating, or providing personalized recommendations for activities, products, services, source of entertainment, time management, or any other kind of recommendation related to the user request. In an embodiment, the recommendation engine 912 may be configured to use information about the user location such as to provide location based responses options to the user.

In an embodiment, at 1010, the computing device 102 may be configured to present the available options based on the user current location. In an example, if the user request includes "a romantic place for date", then the computing device 102, in communication with the server 104, may receive responses based on the user current location. For example, the computing device 102 may determine the location of the user such as for example "office" and associates the location information with the user request. In an example, the server 104 may calls the web services 106 via the API 108 such as to provide response options for the user near to the user office. In an example, the server 104 may be configured to receive response options including the list of romantic places availability near to the user current location from the semantic web services 106 via the API 108. The server 104 may present the available options for the user based on the user current location via the computing device 102 such as shown at 1012.

In an embodiment, at 1014, the method 1000 may allow the user to select desired candidate response from the set of available options or responses provided to the user based on the user current location. In an embodiment, the user may select the option via the input device such as to indicate the user desired option to the computing device 102. In an embodiment, the computing device 102, in communication with the server 104, may be configured to perform operations or functions desired by the user. In an embodiment, the computing device 102 may obtain ticket, pass or reservation based on the user request. For example, in response to receiving the user desired option, the computing device 102 may book a romantic place on behalf of the user. In an embodiment, the computing device 102 schedule meetings, create reminders, check stocks, sports scores, weather, and the like in response to receiving the confirmation from the user.

Next is discussed an example of a method 1100 for providing assistance to the user based on user location information, in accordance to an embodiment of the present invention. In an embodiment, the method 1100 may allow the computing device 102 to receive user request. In an embodiment, the user may provide the request through the voice or speech to the computing 102. Examples of different types of input data request which may be accessed or utilized by the computing device 102 may include, but are not limited to, voice input, text input, location information coming from sensors or location-based systems, time information from clocks on client devices, automobile control systems, clicking and menu selection, or other input.

In an embodiment, at 1104, the method 1100 may allow the computing device 102 to determine semantics of the user request. The server 104 may be configured to interpret the spoken voice of the user such as to determine the semantics of the user request. The computing device 102, in communication with the server 104 may be configured to interpret the spoken voice of the user or other information associated with the user request such as to determine the semantics of the user request. In an example, the server 104 may be configured to match the word, phrase, or syntax such as to identify at least one task, at least one domain, and at least one parameter in accordance with the request received from the user such as shown at 1106.

In an embodiment, at 1108, the method 1100 may allow the computing device 102, in communication with the server 104, to determine the user intent in accordance with the request received from the user. The computing device 102 may analyze the user request such as to identify a set of syntactic contents of the user request. The syntactic contents of the user described herein may be used to associate data in the user request with structures that represent syntactic parts of speech, clauses, and phrases. In an embodiment, the computing device 102, in communication with the server 104, may parse the information associated in the user request such as to identify words, phrase, concept, relationship, properties, entities, quantities, propositions, or other representations of meaning or interpretation of the user request such as to identify the user intent. In an embodiment, the user intent may be represented by a set of elements, instances of models, or databases, nodes, or the like in the ontologies 700 such as described in FIG. 7.

In an embodiment, at 1110, the method 1100 may allow the server 104 such as to access the one or more semantic web services 106 through the API 108. In an embodiment, the server 104 may control many features and operations of the computing device 102. In an example, the server 104 may interact with the semantic web services 106 such as via the APIs 108 to perform functions and operations that may be initiated using a conventional user interface on the computing device 102. Such functions and operations may include, for example, adding a contact, removing a contact, setting an alarm, making a telephone call, sending a text message or email message, adding a calendar event, providing suggestions to the user, and the like. In an embodiment, the functions and operations may be performed such as for example, by initiating, activating, or interfacing with any semantic web services 106 that may be available, installed, or running on the computing device 102 via the API 108, or by calling services that are available over the communication network such as the Internet via the API 108. In an embodiment, the activation, initiation, interface, or any form of communication with the semantic web services 106 may be performed via the API 108 stored thereon.

In an embodiment, the computing device 102, in communication with the server 104, may be configured to provide perform operations or functions on the computing device 102 on behalf of the user. In an embodiment, computing device 102, in communication with the server 104, may be to be configured to perform operations, functions such as for example, but not limited to, actively interview the user to elicit information or input, interpret user intent, disambiguate among candidate interpretations, request and clarify required information from the user, perform actions based on the user intent, and the like. The functions and operations described herein may be specified by the user, or they may be automatically performed based on the context of the user voice request.

In an embodiment, at 1112, allow the computing device 102 to determine the current location of the user. In an embodiment, the user current location information may be combined with the user intent such as to provide at least one location based response to the user. In an embodiment, response to the user may be personalized based on the user current location such as user at home, office, park, or the like locations.

In an embodiment, at 1116, the method 1100 may allow the computing device 102 to interview the user to elicit profile and interests in accordance with the request received from the user. In an embodiment, the server 104 may include or implement using any of a number of different platforms APIs such as to interview the user to elicit profile and interests. The requests interviewing the user to elicit profile and interests may be presented to the user via the computing device 102. In an embodiment, computing device 102, in communication with the server 104, may interview the user profile information and interest such as to better interpret the semantics of the user request. In an embodiment, the server 104 may uses the user profile and interest such as to provide at least one response to the user in accordance with the request received from the user. In an embodiment, response to the user may be personalized based on the user interest and profile information.

In an embodiment, at 1118, the method 1100 may allow the computing device 102, in communication with the server 104, to retrieve answers from the web services 106. In an embodiment, the semantic web services 106 may be configured to include user generated data, ratings, and the like information such as to provide responses to the user. In an embodiment, the computing device 102, in communication with the server 104, may be configured to send request to the semantic web services 106 via the API 108 to retrieve answers related to the user request. In an embodiment, the computing device 102 may receive the user generated recommendations via the recommendation engine 912. In an embodiment, semantic web services 106 may be configured to use the user intent information, the user profile and interest information, user current location information, and the like to provide at least one response to the user. In an embodiment, the computing device 102, in communication with the server 104, may be configured to receive at least one response option based on the user intent, the user profile and interest, the user current location information, or the like via the API 108.

In an embodiment, at 1120, the computing device 102 may be configured to present the available options that match the user request. In an embodiment, the computing device 102 may present the at least one available option based on the user current location. In an embodiment, the computing 102 may be configured to present the at least one available option based on the user profile and interest. In an embodiment, at 1122, the method 1100 may allow the computing device 102 to receive confirmation from the user. In an embodiment, the user may select a desired candidate response from the available option. In an embodiment, at 1124, in response to receiving confirmation from the user, the method 1100 may allow the computing device 102 to determine at least one responsive answer for the user. In an embodiment, at 1126, in response to receiving confirmation from the user, the method 1100 may allow the computing device 102 to obtain ticket, pass or reservation, on behalf of user, in accordance with the request received from the user. In an embodiment, the method 1100 may allow the computing device 102 to schedule meetings, create reminders, check stocks, sports scores, weather and the like, in accordance with the request received from the user.

In an embodiment, at 1128, the method 1100 may allow computing device 102 to provide response to the user. In an embodiment, computing device 102, in communication with the server 104, may call the API 108 such as to perform an operation or function on the computing device 102, on behalf of the user, as a response to the user request. For example, the server 104 may add contact information in the contact application of the computing device 102 as response to the request received from the user. In an embodiment, the server 104 may provide options or information as the response to the user request. The information described herein may be extracted from the user generated reviews, ratings, user patent history, and the like sources.

The flowcharts described herein may include various steps summarized in individual block or act. The steps may be performed automatically or manually by the user, the computing device, the one or more servers, the databases, or the like. The flowcharts may provide a basis for a control program which may be readily apparent or implemented by a person skilled in art by using the flowcharts and other description described in this document.

The methods or system described herein may be deployed in part or in whole through a machine that executes software programs on a server, client, or other such computer and/or networking hardware on a processor. The processor may be part of a server, client, network infrastructure, mobile computing platform, stationary computing platform, or other computing platform. The processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon.

The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client.

The server may provide an interface to other devices including, without limitation, clients, other servers, printers, database servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention.

The methods described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon and all such implementations may be within the scope of the present disclosure. Furthermore, the elements depicted in the flow chart and block diagrams or any other logical component may be implemented on a machine capable of executing program instructions. Thus, while the foregoing drawings and descriptions set forth functional aspects of the disclosed methods, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

The foregoing descriptions of specific embodiments of the present invention may be presented for the purposes of illustration and description. They may not intend to be exhaustive or to limit the invention to the precise forms disclosed. Obviously, many modifications and variations are possible in view of the above teachings. The embodiments were chosen and described to best explain the basic steps of the invention and its practical applications, thereby enabling others skilled in the art to best utilize the invention and various embodiments with various modifications as may be suited to the particular use. Furthermore, the order of steps, tasks or operations in the method may not necessarily intend to occur in the sequence laid out. It is intended that the scope of the invention is defined by the following claims and their equivalents.

What is claimed is:

1. A method for providing assistance to a user, comprising:
  receiving a user request for assistance from a mobile device;
  determining semantics of the user request and identifying at least one domain, at least one task, and at least one parameter for the user request by parsing the user request to identify representations of meaning or interpretation of the user request along with location and user personal information captured by the mobile device including telephone, texting, and user activity;
  accessing one or more semantic web services, each service accessed through an application program interface (API) to retrieve data matching the at least one domain, at least one task, and at least one parameter;
  identifying, generating, or providing personalized recommendations for activities, products, services,
  presenting possible responses to the user by interact with the semantic web services by calling the services through the API and extracting one or more options or suggestions from the semantic web services through the API and confirming user responses by accessing a text messaging API or a phonebook API;
  determining at least one responsive answer; and
  responding to the user request.

2. The method of claim 1, wherein the web service comprises the web ontology language.

3. The method of claim 1, wherein the web service comprises RDF.

4. The method of claim 1, comprising retrieving answers from web services that collect user generated data.

5. The method of claim 1, comprising scheduling meetings, create reminders, check stocks, sports scores, and the weather.

6. The method of claim 1, comprising determining user intent from user queries and incorporate user intent data to fine-tune future responses.

7. The method of claim 1, comprising retrieving the user's current location and provides information and options based on the current location, whether at work, school, or on vacation.

8. The method of claim 1, comprising obtaining a ticket, pass or reservation based on the user request.

9. The method of claim 1, comprising inferencing personal information including calendar entries and completes a task based on the personal information.

10. The method of claim 1, comprising receiving user generated content and performing machine learning to extract clusters and dimensions and recommending activities for the user based on multidimensional matching.

11. The method of claim 1, comprising interviewing a user to elicit profile and interests.

12. The method of claim 1, wherein the API supports communication with a recommendation engine.

13. The method of claim 1, comprising recommending potential matching romantic interests for the user.

14. The method of claim 1, comprising recommending potential matching romantic interests for the user.

15. The method of claim 1, comprising recommending potential matching romantic interests for the user.

16. The method of claim 1, comprising recommending potential matching romantic interests for the user.

17. The method of claim 1, comprising recommending potential matching romantic interests for the user.

18. The method of claim 1, comprising recommending potential matching romantic interests for the user.

19. A system, comprising:
  a computing device that captures profile and interests in accordance with previous requests received from the user;
  a server in communication with the computing device, the server accessing the one or more semantic web services through an application program interface (API) to perform functions and operations initiated using a user interface on the computing device, the server performing operations including adding a contact, removing a contact, setting an alarm, making a telephone call, sending a text message or email message, adding a calendar event, providing suggestions to the user, the server initiating, activating, or interfacing with any semantic web services on the computing device via the API;

an ontology associated with the semantic web services that integrates models, components, or data with representations of a restaurant and meal event having a dining domain model linked to restaurant concept and meal event concept, including event planning task flow models for planning of events independent of domains, applied to a domain-specific event;

general event planning task flow models including nodes representing events and concepts involved in planning events with node meal event; and dialog flow models for relating and unifying various components to handle constraint in the dialog flow model as part of a cluster of nodes representing meal event concept; and a model of a restaurant reservation service associated with the dialog flow for getting values required for that service to perform a transaction and linked or related to a general dialog flow model for asking the user about the constraints for a transaction.

20. A system to assist a user, comprising:

a computing device that captures profile and interests in accordance with previous requests received from the user; and a server in communication with the computing device, the server accessing the one or more semantic web services through an application program interface (API) to perform functions and operations initiated using a user interface on the computing device, the server performing operations including adding a contact, removing a contact, setting an alarm, making a telephone call, sending a text message or email message, adding a calendar event, providing suggestions to the user, the server initiating, activating, or interfacing with any semantic web services on the computing device via the API, wherein the computing device applies a current location of the user to the user intent to provide at least one location based response to the user for personalization based on a user current location and wherein the computing device retrieves answers from the web services and user generated recommendations and obtains ticket, pass or reservation, on behalf of user, in accordance with the request received from the user.

* * * * *